United States Patent Office 3,360,525
Patented Dec. 26, 1967

3,360,525
PENTACOORDINATE SILICON COMPLEXES II
Cecil L. Frye, Midland, Mich., assignor to Dow Corning Corporation, Midland, Mich., a corporation of Michigan
No Drawing. Filed Nov. 16, 1964, Ser. No. 411,598
48 Claims. (Cl. 260—294.7)

ABSTRACT OF THE DISCLOSURE

New pentacoordinate silicon complexes and methods of preparing them are disclosed. These complexes are particularly useful as catalysts or curing agents for epoxy resins.

---

This invention relates to pentacoordinate silicon complexes and to methods of preparing them.

This application is a continuation-in-part of abandoned application Ser. No. 358,649, filed Apr. 9, 1964.

The existence of extracoordinate (penta- and hexacoordinate) silicon complexes has been known for quite some time. Illustrative of the extracoordinate silicon complexes that have been prepared are those reported by:

(1) Eaborn; "Organosilicon Compounds," Butterworth Scientific Publications, London (1960), pp. 92–94,
(2) Finestone, Canadian Patent No. 638,580, issued Mar. 20, 1962,
(3) Frye, Vogel and Hall; J.A.C.S. 83, 996 (1961),
(4) Muller and Heinrich; Chem. Ber. 94, 1943 (1961),
(5) Rosenheim, Raibmann and Schendel; Z. Anorg. Allgem. Chem. 196, 160 (1931),
(6) Schmitz-DuMont, Merten and Eiding; Z. Anorg. Allgem. Chem. 319 (5/6), pp. 362–74 (1963),
(7) Weiss, Reiff and Weiss; Z. Anorg. Allgem. Chem. 311, p. 151 (1961),
(8) West; J. Org. Chem. 23, pp. 1552–53 (1958), and
(9) West; J. Am. Chem. Soc. 80, pp. 3246–49 (1958).

In spite of the fact that such complexes have been known for a long time, they have generally been of academic interest only and even in the academic field relatively little work has been done on them as is apparent from the above mentioned work.

It will be noted from the work done in the field of extracoordinate silicon complexes that most of the complexes reported contained silicon-oxygen bonds and that few of the complexes reported contained silicon-carbon bonds.

It is an object of this invention to provide new pentacoordinate silicon complexes. It is a further object of this invention to provide methods for preparing such pentacoordinate silicon complexes. Other objects and advantages of this invention will be apparent from the following description, the examples, and the claims.

More specifically, this invention relates to pentacoordinate silicon complexes having the general formula

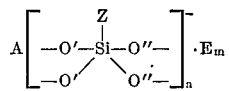

wherein Z is a monovalent radical attached to the silicon atom via a silicon-carbon bond, the O' oxygen atoms are attached to carbon atoms of an aromatic ring which are ortho to each other, the O" oxygen atoms are attached to carbon atoms of an aromatic ring which are ortho to each other, A is a cation formed from a base, $n$ is an integer not greater than the valence of A, E is unprotonated amine when A is formed from an amine and $m$ is from zero to an integer.

This invention also relates to a method for preparing pentacoordinate silicon complexes having the general formula

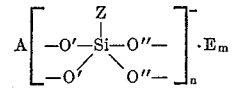

wherein Z is a monvalent radical attached to the silicon atom via a silicon-carbon bond, the O' oxygen atoms are attached to carbon atoms of an aromatic ring which are ortho to each other, the O" oxygen atoms are attached to carbon atoms of an aromatic ring which are ortho to each other, A is a cation formed from a base, $n$ is an integer not greater than the valence of A, E is unprotonated amine when A is formed from an amine and $m$ is from zero to an integer, said method comprising reacting (1) a compound selected from the group consisting of compounds having the formula $ZSiX_3$, wherein Z is as defined above and X is a hydrolyzable radical, and hydrolyzates thereof, (2) an aromatic compound having at least two hydroxy groups on the aromatic ring which are ortho to each other and (3) a base.

This invention further relates to pentacoordinate silicon complexes having the general formula

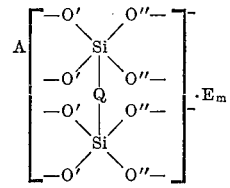

wherein Q is a divalent radical attached to each silicon atom via a silicon-carbon bond, the O' oxygen atoms are attached to carbon atoms of an aromatic ring which are ortho to each other, the O" oxygen atoms are attached to carbon atoms of an aromatic ring which are ortho to each other, A is a cation formed from a base, the ratio of the anions to cations is such that there is an equal number of positive and negative charges in the complex, E is unprotonated amine when A is formed from an amine and $m$ is from zero to an integer.

This invention still further relates to a method for preparing pentacoordinate silicon complexes having the general formula

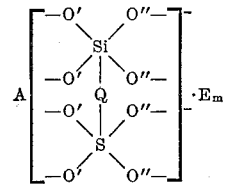

wherein Q is a divalent radical attached to each silicon atom via a silicon-carbon bond, the O' oxygen atoms are attached to carbon atoms of an aromatic ring which are ortho to each other, the O" oxygen atoms are attached to carbon atoms of an aromatic ring which are ortho to each other, A is a cation formed from a base, the ratio of anions to cations is such that there is an equal number of positive and negative charges in the complex, E is unprotonated amine when A is formed from an amine and $m$ is from zero to an integer, said method comprising reacting (1) a compound selected from the group consisting of compounds having the formula $X_3SiQSiX_3$, wherein Q is as defined above and X is a hydrolyzable radical, and hydrolyzates thereof, (2) an aromatic compound having at least two hydroxy groups on the aromatic ring which are ortho to each other and (3) a base.

In the above formulae, Z can be any monovalent radical so long as it is attached to the silicon atom via a silicon-carbon bond. Thus, Z can be, for example, any aliphatic hydrocarbon radical such as a methyl, ethyl, propyl, butyl, amyl, octyl, decyl, dodecyl, octadecyl, vinyl, allyl or a propargyl radical; any cyclic hydrocarbon radical such as a cyclopentyl, cyclohexyl, phenyl, xenyl, naphthyl, tolyl, xylyl, mesityl, benzyl or a phenethyl radical; or any substituted hydrocarbon radical such as a chloromethyl, 3-chloropropyl, 3,3,3-trifluoropropyl, dichlorophenyl, p - bromobenzyl, α,α,α - trifluorotolyl, aminomethyl, aminoethyl, β-carboxyethyl, 3-mercaptopropyl, 3-cyanopropyl, 3-aminopropyl, —(CH$_2$)$_3$NH(CH$_2$)$_2$NH$_2$
—CH$_2$CH(CH$_3$)CH$_2$NH(CH$_2$)$_2$NH$_2$,
—(CH$_2$)$_3$NH(CH$_3$)
—(CH$_2$)$_3$N≡C, —(CH$_2$)$_3$OOCC(CH$_3$)=CH$_2$,
—(CH$_2$)$_3$OCH$_2$CH$_3$
—(CH$_2$)$_3$OH, —C$_6$H$_4$OH, —(CH$_2$)$_3$OC≡N,
—(CH$_2$)$_3$NO$_2$
—(CH$_2$)$_3$SC≡N or a —CF=CF$_2$ radical.

In the above formulate, Q can be any divalent radical attached to each silicon atom via a silicon-carbon bond. Thus, for example, Q can be any divalent ether radical or any divalent hydrocarbon radical such as —CH$_2$CH$_2$—, —CH$_2$CH$_2$CH$_2$—, —CH$_2$CH(CH$_3$)CH$_2$—,
—CH$_2$CH$_2$CH$_2$OCH$_2$CH$_2$CH$_2$—

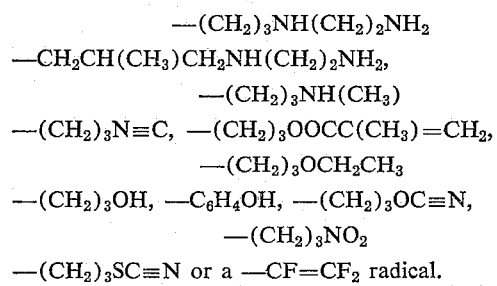

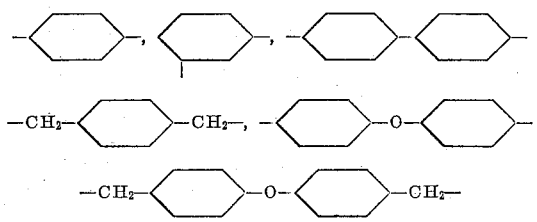

or —CH$_2$CH$_2$CH$_2$OCH$_2$(CHOH)CH$_2$OCH$_2$CH$_2$CH$_2$—.

The cation A can be any cation formed from a base. For example, the base can be an alkali metal hydroxide, an alkaline earth metal hydroxide, all manner of ternary nitrogen compounds such as primary, secondary and tertiary aliphatic or aromatic amines, alkanolamines, quaternary ammonium compounds, hydrazines, guanidines, phosphines, phosphonium hydroxides, and heterocyclic nitrogen compounds such as pyridines. Specific examples of suitable bases are sodium hydroxide, potassium hydroxide, barium hydroxide, ammonium hydroxide, rubidium hydroxide, magnesuim hydroxide, zinc hydroxide, manganous hydroxide, nickelous hydroxide, cobaltous hydroxide, cobaltic hydroxide, methylamine, ethylamine, propylamine, isopropylamine, butylamine, amylamine, hexylamine, decylamine, dodecylamine, octadecylamine, dimethylamine, diethylamine, methylamylamine, triethylamine, tripropylamine, diethylmethylamine, cyclohexylamine, benzyldimethylamine, aniline, dimethylaniline, toluidine, ethanolamine, diethanolamine, triethanolamine, ethylene diamine, cadaverine, hexamethylenediamine, diethylenetriamine, pyridine, guanidine, tetramethylguanidine, melamine, cinchonine, tetrabutylphosphonium hydroxide, tetraphenylphosphonium hydroxide, strychnine, brucine, tetramethylammonium hydroxide, trimethyl-beta-hydroxyethyelammonium hydroxide, benzyltrimethylammonium hydroxide, cetyltrimethylammonium hydroxide, tallowtrimethylammonium hydroxide and 2,4,6-tri(dimethylaminomethyl)phenol. Mixtures of amines can be employed in making the complexes and for some uses such complexes are preferred.

As stated above, $n$ is an integer not greater than the valence of A. Thus, for example, when A is monovalent, $n$ is 1. When A is divalent, $n$ is 1 or 2. When A is trivalent, $n$ is 1, 2 or 3. When A is tetravalent, $n$ is 1, 2, 3 or 4 and so on. In speaking of valences with respect to the cations formed from amines, it might be well to mention here that it is the number of nitrogen atoms that become protonated during the reaction that are being referred to as the valence. Thus, it should be obvious to those skilled in the art that in the case of polyamines one or more of the nitrogen atoms can become protonated. For example, ethylene diamine can form either the H$_2$NCH$_2$CH$_2$NH$_3^+$ cation with only one protonated nitrogen, or the $^+$H$_3$NCH$_2$CH$_2$NH$_3^+$ cation with both of the nitrogens protonated. As for the complexes of the formula

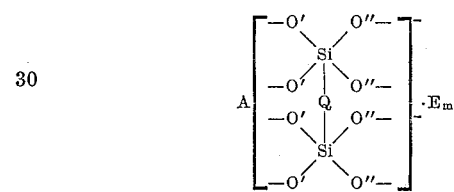

the ratio of the anions to cations is such that there is an equal number of positive and negative charges in the complex. Thus, for example, when A is monovalent there must be an anion to cation ratio of 1:2. When A is divalent, there must be an anion to cation ratio of 1:1. When A is trivalent, there must be an anion to cation ratio of 3:2 and so on. It should be understood that when A is divalent, for example, that A can satisfy both valences of the anion or it can satisfy one valence of two different anions while another cation satisfies the other valence.

As stated in the above definitions, E is unprotonated amine when A is formed from an amine. When A is not formed from an amine there is no E in the formula. It is not known how this unprotonated amine is held in the complex, i.e. by clathration, hydrogen bonding, some other means or a combination of these. It is known, however, that such complexes do exist and can be prepared when an excess of an amine having a relatively unbulky structure is employed in making the complex. E can be, of course, the same as the amine used to form cation A or it can be different.

The subscript $m$ can be from zero to an integer, i.e. zero, a fraction or an integer. When $m$ is zero, there is no unprotonated amine (E) in the complex. When $m$ is a fraction, there is less than a full mol of unprotonated amine in the complex, and when $m$ is an integer there is at least one full mol of unprotonated amine in the complex. Of course, $m$ can be a mixed number also.

It should be understood that in some instances it may be desirable to generate the base which is to form the cation in situ. For example, when manganese or nickel is to be the cation one can employ a mixture of manganese or nickel sulfate and sodium hydroxide rather than the hydroxide per se of the metal. Likewise, one can employ a mixture of pyridine hydrochloride and ammonium hydroxide instead of pyridine per se.

As pointed out above, the pentacoordinate silicon complexes of this invention are prepared by reacting (1) silanes having the formulae $ZSiX_3$, $X_3SiQSiX_3$ or hydrolyzates thereof, (2) an aromatic compound having at least two hydroxy groups on the aromatic ring which are ortho to each other and (3) a base. Ideally, these compounds are reacted in a silane to aromatic hydroxy compound to base mole ratio of 1:2:1 in the case of the silanes $ZSiX_3$ and a mole ratio 1:4:2 in the case of the silanes $X_3SiQSiX_3$. Of course, more or less of any one of the three reactants can be employed. When the base is an amine and employed in excess of the theoretical amount needed, complexes containing unprotonated amine can be formed.

Reaction of the ingredients can proceed at room temperature or one can merely heat a mixture of the three reactants. The amount of heating is not critical, so far as is known, and can vary from a simple warming of the mixture to heating the mixture at reflux. When the base is strong, the reaction proceeds rapidly even at room temperature and even at high dilution in appropriate solvents. As indicated, the three ingredients can merely be mixed and reacted or the reaction can be carried out in a suitable solvent if so desired.

When heating is employed the time can vary considerably. For example, the time can range anywhere from about 5 to 30 minutes or more depending to some extent, of course, on the temperature employed. Generally speaking, however, heating for about 15 to 30 minutes at the boiling point of the mixture is adequate to get substantially complete reaction.

While no special conditions of pressure or no special atmosphere is needed during the preparation of the complexes by the process of this invention, sub-atmospheric pressures, super-atmospheric pressures, inert atmospheres and other special conditions can be employed if so desired.

The silanes that can be employed as starting materials are any of the silanes having the formula $ZSiX_3$, $X_3SiQSiX_3$ or hydrolyzates thereof. Z and Q have been defined above. X can be any hydrolyzable group. For example, X can be a halogen atom such as a fluorine, chlorine or bromine atom; an alkoxy group such as a methoxy, ethoxy, isopropoxy or a butoxy group; an aryloxy group such as a phenoxy group; an acyloxy group such as an acetoxy group; or a —$OCH_2CH_2OCH_3$,

—$OCH_2CH_2OCH_2CH_3$ or a —$OCH_2CH_2OH$ group. Preferably, X is a methoxy or ethoxy group. It is possible in some instances, for example, to have the Z function and the base in the same molecule (see Examples 14 and 15). While the formulae employed in the specification and claims have the cation and anion as being "separate," these formulae are intended to include complexes of the type illustrated by aforementioned Examples 14 and 15.

Any aromatic compound having at least two hydroxy groups on the aromatic ring which are ortho to each other can be employed in the making of the pentacoordinate silicon complexes of this invention. Specific examples of such compounds that can be employed are catechol, 3-methylcatechol, t-butylcatechol, pyrogallol, gallic acid, 4,5-dibromocatechol, 1,2-dihydroxynaphthalene, 2,3-dihydroxybiphenyl, 2,3,4 - trihydroxybiphenyl, 2,3 - dihydroxynaphthalene, alizarin, 3-nitroalizarin, 3-methylalizarin, 1,2 - anthracenediol, anthragallol, anthrapurpurin, hexahydroxybenzene, benzenetetrol, protocatechuic acid, adrenaline, caffeic acid, flavopurpurin, gallacetophenone, gallanilide, gallein, gallin, 1,2,4-benzenetriol, hystazarin, isonaphthazarin, maclurin, phenanthrahydroquinone, 2,3,4-trihydroxy-9-acridone, 2,3-dihydroxyquinoline, cyanidin chloride, 2,3-dihydroxypyridine, 3,4-dihydroxyacridine, 3,4-dihydroxybenzoic acid, quercetin, the methyl ester of gallic acid, 3,4,5-phenanthrenetriol, protocatechualdehyde, purpurin, 2,3-dihydroxybenzoic acid, quinalizarin, rufigallic acid and rufiopin. Thus it can be seen that the only critical features of the radical to which the O′ and O″ oxygens are attached is that the oxygens be attached to an aromatic ring in the 1,2 relationship. Apart from these two features the aromatic radical can contain any number of aromatic rings and can have any kind and number of substituents on the aromatic ring or rings which are capable of existing with a phenolic hydroxyl.

The pentacoordinate silicon complexes of this invention are useful, for example, as catalysts or curing agents for epoxy resins, molding compounds, epoxyanhydride resins and silicone rubbers. The metal salts can also be used to prepare less soluble amine salts.

One of the unique characteristics of the complexes of this invention is that by varying the nature of the Z or Q radical and the nature of the substituents on the aromatic ring of the ortho hydroxy compounds, one can vary the stability of the complexes and thereby tailor the complexes to fit various needs. Thus, generally speaking, the more symmetrical the complexes formed the more stable the complex. Also, when Z, Q or the substituents on the aromatic ring of the ortho hydroxy compounds are electron acceptors (or electron withdrawing groups) the complexes will tend to be more stable than when they are electron donors.

In order that those skilled in the art can better understand how the present invention can be practiced, the following examples are given by way of illustration and not by way of limitation. In the examples, the amine was added to a mixture of the other reactants.

*Example 1*

To a 125 ml. Erlenmeyer flask there was added 5.94 g. (0.030 mole) of phenyltrimethoxysilane, 6.60 g. (0.060 mole) of catechol, 20 g. of methanol and 5.0 g. (0.037 mole) of benzyldimethylamine. The flask contents were boiled on a hot plate for 10–15 minutes during which time a crystalline solid precipitated out. This solid was filtered out, washed with cold methanol and evacuated to constant weight to give 10.1 g. (74% yield) of

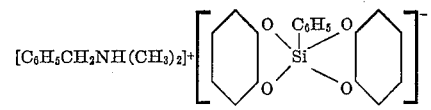

The complex had a melting point of 196–198° C. Analysis of the complex gave the following results:

Theoretical: Percent C, 70.9; percent H, 5.91; percent Si, 6.14; percent N, 3.06; neutral equivalent, 457. Found: Percent C, 70.9; percent H, 6.08; percent Si, 5.98; percent N, 3.00; neutral equivalent, 462.

*Example 2*

To a 1-ounce vial there was added 1.98 g. (0.010 mole) of phenyltrimethoxysilane, 2.20 g. (0.020 mole) of catechol and 1.6 g. (0.020 mole) of pyridine. The ingredients were then heated at 80–100° C. for 5–10 minutes at the end of which time a crystalline solid had precipitated out. Methanol was then added to the vial, the solid washed by decantation, and then evacuated to yield

The colorless crystalline solid had a melting point of 212–218° C. (decomposes) and a neutral equivalent of 405 (theoretical 401).

*Example 3*

To a 125 ml. Erlenmeyer flask there was added 5.00 g. (0.033 mole) of ethyltrimethoxysilane, 6.60 g. (0.060 mole) of catechol, 10 g. of methanol and 5.0 g. (0.037 mole) of benzyldimethylamine. The flask contents were boiled for 30 minutes and then extracted with several portions of boiling hexane to give 10.45 g. (85% yield) of a white solid which was

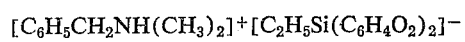

Example 4

To a 125 ml. suction flask there was added 1.98 g. (0.010 mole) of phenyltrimethoxysilane, 2.20 g. (0.020 mole) of catechol, 15 ml. of methanol and 2.02 g. (0.020 mole) of triethylamine. A mild exotherm was noted upon addition of the amine. The flask was stoppered and allowed to stand for two hours at the end of which time 0.96 g. of a crystalline precipitate had formed. The precipitate was removed by filtration and the filtrate chilled in a freezer. Another 2.3 g. (total yield 78%) of the crystalline solid was obtained. The complex, $$[(C_2H_5)_3NH]^+[C_6H_5Si(C_6H_4O_2)_2]^-$$

had a melting point of 220–230° C. Analysis of the complex gave the following results.

|  | Theoretical | Found |
|---|---|---|
| Percent C | 68.1 | 68.6 |
| Percent H | 6.86 | 7.04 |
| Percent Si | 6.64 | 6.57 |
| Percent N | 3.31 | 3.29 |
| Neutral Equivalent | 423 | 424 |

To a 50 ml. Erlenmeyer flask there was added 2.26 g. (0.010 mole) of beta-phenethyltrimethoxysilane, 2.20 g. (0.020 mole) of catechol, 15 ml. of methanol and 4.04 g. (0.040 mole) of triethylamine. The addition of the amine caused a temperature increase of about 12–14° C. The ingredients were then heated to about 70° C. for 1 hour. Upon cooling, 2.81 g. of the white crystalline solid $$[(C_2H_5)_3NH]^+[C_6H_5CH_2CH_2Si(C_6H_4O_2)_2]^-$$

formed. An additional crop of 0.45 g. (total yield 72%) of the crystals was obtained. The complex had a melting point of 150–160° C. and a neutral equivalent of 456 (theoretical 451).

Example 6

To a flask there was added 73.3 g. (0.65 mole) of catechol, 50 g. (0.34 mole) of vinyltrimethoxysilane, 50 g. of ethanol and 11 g. (0.34 mole) of hydrazine. The addition of the hydrazine caused a slight exotherm but no precipitate formed. Then about 300 ml. of heptane was added to the flask and the mixture heated for about one hour during which time methanol was distilled out of the system causing the product to solidify. The solid was removed and vacuum dried to obtain $$[NH_2NH_3]^+[CH_2\!\!=\!\!CHSi(C_6H_4O_2)_2]^-$$

which had a neutral equivalent of 304 (theoretical 304).

Example 7

To a flask there was added 44 g. (0.40 mole) of catechol, 27.2 g. (0.20 mole) of methyltrimethoxysilane, 50 g. of ethanol and 6.4 g. (0.20 mole) of hydrazine. The addition of the hydrazine caused a slight exotherm. The mixture was refluxed for about 20 minutes and then cooled which caused the preciiptation of some crystals. Then about 200 ml. of heptane was added to the flask and the mixture refluxed for a short time whereupon the entire product layer turned to crystals of $$[NH_2NH_3]^+[CH_3Si(C_6H_4O_2)_2]^-$$

The crystals were filtered and vacuum dried. The complex had a neutral equivalent of 289 (theoretical 292).

Example 8

To a flask there was added 110 g. (1 mole) of catechol, 74 g. (0.050 mole) of vinyltrimethoxysilane, about 150 g. of ethanol and 66.2 g. (0.27 mole) of 2,4,6-tri(dimethylaminomethyl)phenol. The mixture was heated at reflux for about 5 minutes and then cooled slightly which caused the formation of some crystals. Further heating and cooling resulted in the formation of considerable amount of crystals of the complex

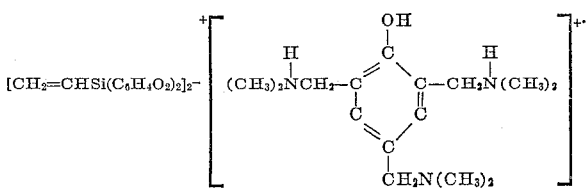

The crystals were filtered and vacuum dried. The complex had a neutral equivalent of 271 (theoretical 268).

Example 9

To a flask there was added 49 g. (0.45 mole) of catechol, 44 g. (0.24 mole) of phenyltrimethoxysilane, about 100 ml. of ethanol and 29.4 g. (0.12 mole) of 2,4,6-tri(dimethylaminomethyl)phenol. The mixture was heated on a hot plate for 30 minutes. Upon further heating a white crystalline solid precipitated. These crystals of

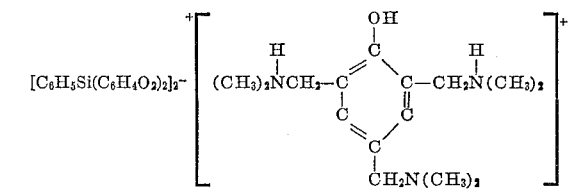

were filtered and vacuum dried. The complex had a neutral equivalent of 304 (theoretical 303).

Example 10

To a flask there was added 73.3 g. (0.65 mole) of catechol, 66 g. (0.33 mole) of phenyltrimethoxysilane, 50 ml. of methanol and 10 g. (0.17 mole) of ethylenediamine. Addition of the amine caused the mixture to boil and resulted in a clear solution. The mixture was then refluxed for 15 minutes, cooled and shaken. A white crystalline precipitate formed. The precipitate was digested for 30 minutes in boiling ethanol, cooled, filtered and vacuum dried. The resulting complex, $$[C_6H_5Si(C_6H_4O_2)_2]^-+[H_3NCH_2CH_2NH_3]^{+-}$$
$$[C_6H_5Si(C_6H_4O_2)_2]$$

had a neutral equivalent of 354 (theoretical 352).

Example 11

To a flask there was added 33 g. (0.17 mole) of phenyltrimethoxysilane, 36.6 g. (0.33 mole) of catechol and 10 g. (0.17 mole) of 1,1-dimethylhydrazine. Slight warming of the mixture caused a slight exothermic reaction. Then 150 ml. of ethanol was added and the mixture digested for 30 minutes. The crystals formed upon cooling were filtered and vacuum dried. The resulting complex, $[(CH_3)_2NNH_3]^+[C_6H_5Si(C_6H_4O_2)_2]^-$, had a neutral equivalent of 381 (theoretical 382).

Example 12

To a flask there was added 110 g. (1 mole) of catechol, 99 g. (0.50 mole) of phenyltrimethoxysilane, 200 ml. of ethanol and 42.5 g. (0.50 mole) of piperidine. Upon addition of the amine there was an immediate exothermic reaction which caused the solvent to boil out and the entire mixture solidified. The solid was filtered, washed with ethanol and dried. The resulting complex, $$[C_5H_{10}NH_2]^+[C_6H_5Si(C_6H_4O_2)_2]^-$$

had a neutral equivalent of 412 (theoretical 407).

Example 13

To a flask there was added 2.20 g. (0.02 mole) of catechol, 1.98 g. (0.01 mole) of phenyltrimethoxysilane and 5.6 g. (0.033 mole) of benzyltrimethylammonium hydroxide (as a 30% solution in methanol). The mixture was heated at reflux on a hot plate and then cooled for 1 hour in a refrigerator whereupon a crystalline precipitate formed. The crystals of $$[(C_6H_5CH_2)(CH_3)_3N]^+[C_6H_5Si(C_6H_4O_2)_2]^-$$

were washed with methanol, dried and then recrystallized from methanol. The complex had a neutral equivalent of 474 (theoretical 471).

Example 14

To a flask there was added 32.2 g. (0.17 mole) of $(CH_3O)_3Si(CH_2)_3NH(CH_3)$, 36.6 g. (0.33 mole) of catechol and 25 g. of ethanol. The additional of the amine caused a violent exotherm which resulted in the immediate precipitation of the white crystalline solid $^+[(CH_3)H_2N(CH_2)_3Si(C_6H_4O_2)_2]^-$. The complex was filtered and vacuum dried. It had a neutral equivalent of 320 (theoretical 317).

Example 15

To a one ounce vial there was added 2.22 g. (0.010 mole) of $(CH_3O)_3Si(CH_2)_3NHCH_2CH_2NH_2$, 3.5 g. of absolute ethanol and 2.20 g. (0.020 mole) of catechol. Boiling the mixture for several minutes resulted in the precipitation of 3.72 g. of the crystalline solid $$^+[HH_2NCH_2CH_2HN(CH_2)_3Si(C_6H_4O_2)_2]^-$$

The complex had a melting point of 205–215° C. and a neutral equivalent of 208 (theoretical 173).

Example 16

To a flask there was added 44 g. (0.40 mole) of catechol, 25 g. of methanol, 39.6 g. (0.20 mole) of phenyltrimethoxysilane and 19.8 g. (0.10 mole) of para-bis(aminophenyl)methylene. The addition of the amine caused a slight exotherm. The mixture was heated at reflux to drive off the methanol. A viscous fluid remained. 300 ml. of heptane was added to the viscous fluid and then the resulting mixture heated at reflux to drive off the residual methanol. A crystalline solid remained which was filtered and dried. The resulting complex,

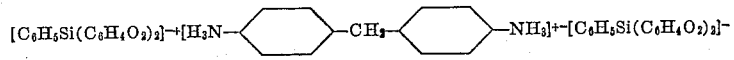

had a neutral equivalent of 425 (theoretical 421).

Example 17

To a flask there was added 49.5 g. of phenyltrimethoxysilane, 55 g. of catechol, 100 ml. of methanol and 13.5 g. of sodium methoxide ($NaOCH_3$). A marked exotherm took place upon addition of the sodium methoxide. The mixture was heated, 200 ml. of heptane added, and then the methanol boiled away. A solid material was obtained which was soluble in refluxing acetone. Upon cooling of the acetone, cvrystals were formed. These crystals were recrystallized from chloroform and found to be $$Na^+[C_6H_5Si(C_6H_4O_2)_2]^-$$

The complex had a neutral equivalent of 345 (theoretical 344).

Example 18

To a flask there was added 44 g. of catechol, 27 g. of benzyldimethylamine and 100 ml. of methanol. To this mixture there was added 54 g. of dichlorophenyltrimethoxysilane which caused a slight exotherm. Upon standing for about 30 minutes, crystals had begun to form in the mixture. When no more crystals formed they were filtered and dried. The crystals were $$[(C_6H_5CH_2)(CH_3)_2NH]^+[Cl_2C_6H_3Si(C_6H_4O_2)_2]^-$$

and the complex was found to have a neutral equivalent of 535 (theoretical 528).

Example 19

To a flask there was added 55 g. of catechol, 49.5 g. of phenyltrimethoxysilane, 100 ml. of methanol and 60.5 g. of a 50% solution of beta-hydroxyethyltrimethylammonium hydroxide in methanol. The complex formed was relatively soluble in methanol. Therefore, 10 ml. of isopropanol was added to the mixture, the mixture heated, and finally cooled. The crystals of the complex $$[(HOCH_2CH_2)(CH_3)_3N]^+[C_6H_5Si(C_6H_4O_2)_2]^-$$

were then filtered and dried. They were found to have a neutral equivalent of 432 (theoretical 425).

Example 20

When the silanes and bases specified below are reacted with catechol employing a silane to catechol to base ratio of about 1:2:1 and the procedure of Example 1, the indicated produce is obtained. When strong acids are products, for example when chlorosilanes are used as starting materials, obviously an appropriate excess of the base should be employed to neutralize the acid.

| Silane | Base | Product |
|---|---|---|
| $C_5H_{11}Si(OOCCH_3)_3$ | $(CH_3)(C_6H_{11})NH$ | $[(CH_3)(C_6H_{11})NH_2]^+ [C_5H_{11}Si(C_6H_4O_2)_2]^-$ |
| $C_6H_5SiCl_3$ | $H_2NNH_2$ | $[H_2NNH_3]^+ [C_6H_5Si(C_6H_4O_2)_2]^-$ |
| 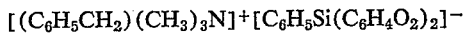$Si(OCH_2CH_2OCH_3)_3$ (with S) | $C_3H_7NH_2$ | $[C_3H_7NH_3]^+ [C_6H_{11}Si(C_6H_4O_2)_2]^-$ |
| $Si(OC_2H_5)_3$ | $(HOCH_2CH_2)_3N$ | $[(HOCH_2CH_2)_3NH]^+ [C_{12}H_9Si(C_6H_4O_2)_2]^-$ |
| 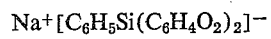$Si(OC_3H_7)_3$ (with $CH_3$) | $(CH_3)_2N-\overset{NH}{\underset{\parallel}{C}}-N(CH_3)_2$ | $[(CH_3)_2N-\overset{NH_2}{\underset{\parallel}{C}}-N(CH_3)_2]^+ [C_7H_7Si(C_6H_4O_2)_2]^-$ |
| $H_2C=C(CH_3)COO(CH_2)_3Si(OCH_3)_3$ | $C_6H_5NH_2$ | $[C_6H_5NH_3]^+ [H_2C=C(CH_3)COO(CH_2)_3Si(C_6H_4O_2)_2]^-$ |
| $CF_3CH_2CH_2Si(OCH_3)_3$ | $(C_6H_5CH_2)(CH_3)_2N$ | $[(C_6H_5CH_2)(CH_3)_2NH]^+ [CF_3CH_2CH_2Si(C_6H_4O_2)_2]^-$ |

Example 21

When the silanes and bases specified below are reacted with catechol employing a silane to catechol to base ratio of about 1:4:2 and the procedure of Example 1, the indicated product is obtained.

| Silane | Base | Product |
|---|---|---|
| (C₂H₅O)₃SiCH₂CH₂Si(OC₂H₅)₃ | (C₂H₅)₃N | [(C₂H₅)₃NH]⁺⁻[(C₆H₄O₂)₂SiCH₂CH₂Si(C₆H₄O₂)₂]⁻ − [HN(C₂H₅)₃]⁺ |
| (CH₃O)₃Si—⟨⟩—Si(OCH₃)₃ | H₂NCH₂CH₂NH₂ | [H₂NCH₂CH₂NH₃]⁺⁻[(C₆H₄O₂)₂SiC₆H₄Si(C₆H₄O₂)₂]⁻ − [H₃NCH₂CH₂NH₂]⁺ |
| (CH₃O)₃SiCH₂CH(CH₃)CH₂Si(OCH₃)₃ | NaOCH₃ | Na⁺⁻[(C₆H₄O₂)₂SiCH₂CH(CH₃)CH₂Si(C₆H₄O₂)₂]⁻Na⁺ |
| (CH₃O)₃Si—⟨⟩—O—⟨⟩—Si(OCH₃)₃ | (H₂NCH₂CH₂)₂NH | [(H₂NCH₂CH₂)₂NH₂]⁺⁻[(C₆H₄O₂)₂SiC₆H₄OC₆H₄Si(C₆H₄O₂)₂]⁻[H₂N(CH₂CH₂NH₂)₂]⁺ |
| (CH₃O)₃Si—⟨⟩—Si(OCH₃)₃ | H₂NNH₂ | [H₂NNH₃]⁺⁻[(C₆H₄O₂)₂SiC₆H₄Si(C₆H₄O₂)₂]⁻⁺[H₃NNH₂] |
| (CH₃O)₃Si—⟨⟩—Si(OCH₃)₃ | H₂NNH₂ H₂NCH₂CH₂NH₂ | [H₂NNH₃]⁺⁻[(C₆H₄O₂)₂SiC₆H₄Si(C₆H₄O₂)₂]⁻⁺[H₃NCH₂CH₂NH₂ |
| (CH₃O)₃Si—⟨⟩—Si(OCH₃)₃ | H₂NNH₂ | [H₂NNH₃]⁺⁻[(C₆H₄O₂)₂SiC₆H₄Si(C₆H₄O₂)₂]⁻⁺[H₃NNH₂] − [H₂NNH₂] |

Example 22

When the following compounds are substituted for catechol in any of the above examples, equivalent results are obtained.

3-methylcatechol  
4,5-dibromocatechol  
2,3-dihydroxynaphthalene  
2,3-dihydroxybenzoic acid  
pyrogallol  
gallic acid  
3,4,5-phenanthrenetriol  
2,3-dihydroxybiphenyl

Example 23

To a flask there was added 3.96 g. (0.02 mol) of phenyltrimethoxysilane, 4.4 g. (0.04 mol) of catechol, 3 g. of methanol and 1.3 g. (0.0216 mol) of ethylenediamine. Addition of the amine caused an exotherm. Upon standing, a crystalline precipitate formed. The product, $$[H_2NCH_2CH_2NH_3]^+[C_6H_5Si(C_6H_4O_2)_2]^-$$

was recrystallized and found to have a neutral equivalent of 192.6 (theoretical 191).

Example 24

To a 250 cc. suction flask there was added 10.74 g. (0.06 mol) of 4,5-dichlorocatechol, 6 g. (0.03 mol) of phenyltrimethoxysilane, 30 g. of methanol and 3.1 g. (0.027 mol) of tetramethylguanidine. The addition of the tetramethylguanidine caused an exotherm. Upon cooling of the solution, crystals formed. The product, $$[(CH_3)_2N—C(NH_2)—N(CH_3)_2]^+ \\ [C_6H_5Si(C_6H_2O_2Cl_2)]^-$$

was recrystallized from isopropanol and found to have a neutral equivalent of 578 (theoretical 575).

Example 25

To a flask there was added 10.74 g. (0.06 mol) of 4,5-dichlorocatechol, 4.2 g. (0.031 mol) of methyltrimethoxysilane, 20 g. of isopropanol and 4.2 g. (0.036 mol) of tetramethylguanidine. The flask and contents were placed in a refrigerator and six days later the crystals that had formed were removed. The crystals were washed rapidly three times with isopropanol, then three times with hexane and then evacuated to constant weight. The product, $$[(CH_3)_2N—C(NH_2)—N(CH_3)_2]^+ \\ [CH_3Si(C_6H_2O_2Cl_2)_2]^-$$

had a neutral equivalent of 516 (theoretical 513).

Example 26

To a one ounce vial there was added 2.2 g. (0.01 mol) of 3,3,3-trifluoropropyltrimethoxysilane, 2.2 g. (0.02 mol) of catechol, 0.58 g. (0.05 mol) of hexamethylenediamine and 5–10 cc. of tetrahydrofuran. When no crystals formed, hexane was added and the solution heated for about 45 minutes to remove methanol formed during the reaction. The solution was then cooled and the sides of the vial scratched whereupon crystallization of the product took place. The crystals were devolatilized by heating for about one hour at 130° C. The product, $$[H_2N(CH_2)_6NH_3]^+[CF_3CH_2CH_2Si(C_6H_4O_2]^-$$

had a neutral equivalent of 398 (theoretical 400).

Example 27

To a one ounce vial there was added 1.98 g. (0.01 mol) of phenyltrimethoxysilane, 2.20 g. (0.02 mol) of catechol and 3 g. (0.041 mol) of n-butylamine. The mixture was heated for about 10–15 minutes at 110° C., cooled to room temperature and then 2 g. (0.027 mol) of n-butylamine and a small amount of methanol added to the vial. Then a sufficient quantity of heptane was added to the vial to cause the white crystalline product to precipitate. The product, $$[C_4H_9NH_2][C_4H_9NH_3]^+[C_6H_5Si(C_6H_4O_2)_2]^-$$

had a neutral equivalent of 237 (theoretical 234).

Example 28

To a one ounce vial there was added 1.98 g. (0.01 mol) of phenyltrimethoxysilane, 2.2 g. (0.02 mol) of catechol, 1.5 g. (0.02 mol) of pyridine and 0.73 g. (0.01 mol) of n-butylamine. The mixture was heated on a hot plate for about one hour, cooled to room temperature and then a sufficient amount of heptane added to cause the precipitation of the product. The product was first washed with hot heptane, then washed with pentane and then devolatilized. The crystalline product, $$[C_4H_9NH_3]^+[C_6H_5Si(C_6H_4O_2)_2]^-·C_6H_5N$$

had a neutral equivalent of 252 (theoretical 237).

Example 29

To a flask there was added 30 g. (0.15 mol) of phenyltrimethoxysilane, 50.5 g. (0.30 mol) of 4-t-butylcatechol, 10 g. (0.167 mol) of ethylenediamine and 100 g. of tetrahydrofuran. When no precipitate formed, about 100 g. of toluene was added to the flask and mixture heated to a flask temperature of about 120° C. to boil off the tetrahydrofuran. The mixture was then diluted with sufficient hexane to cause precipitation of the crystalline product. The product was washed several times with hexane, then ground with mortar and pestle under hexane and finally filtered and evacuated to constant weight. 74.4 g. of product was obtained. It had a neutral equivalent of 270 (theoretical 247) and the structure

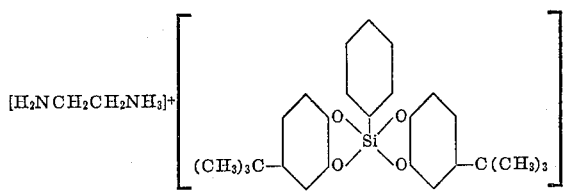

That which is claimed is:

1. A pentacoordinate silicon complex having the general formula

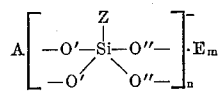

wherein Z is a monovalent radical attached to the silicon atom via a silicon-carbon bond, the O′ oxygen atoms are attached to carbon atoms of an aromatic ring which are ortho to each other, the O″ oxygen atoms are attached to carbon atoms of an aromatic ring which are ortho to each other, A is a cation formed from a base, $n$ is an integer not greater than the valence of A, E is unprotonated amine when A is formed from an amine and $m$ is from zero to an integer.

2. The pentacoordinate silicon complex of claim 1 having the general formula

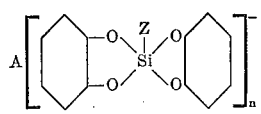

wherein Z is a monovalent hydrocarbon radical and A is a cation formed from an amine.

3. The pentacoordinate silicon complex of claim 2 wherein Z is a phenyl radical.

4. The pentacoordinate silicon complex

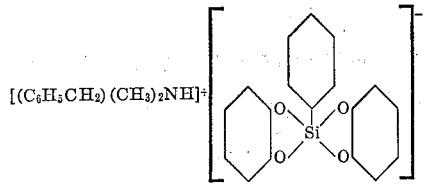

5. The pentacoordinate silicon complex

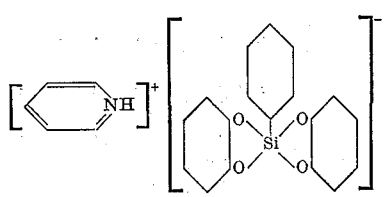

6. The pentacoordinate silicon complex

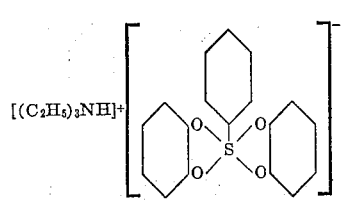

7. The pentacoordinate silicon complex

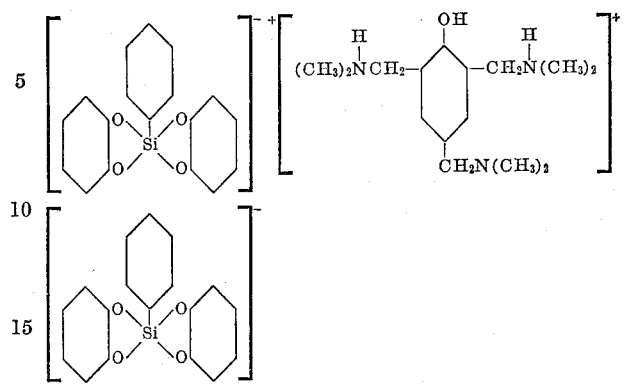

8. The pentacoordinate silicon complex

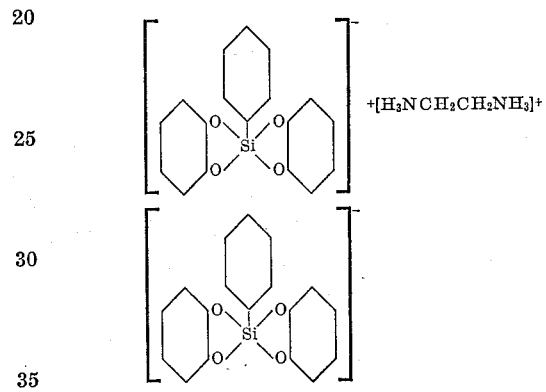

9. The pentacoordinate silicon complex

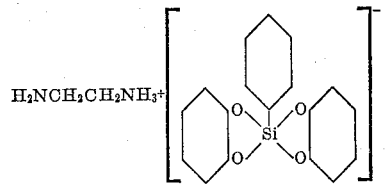

10. The pentacoordinate silicon complex

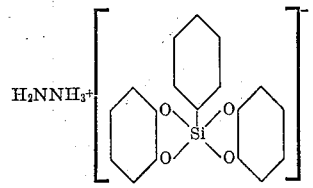

11. The pentacoordinate silicon complex

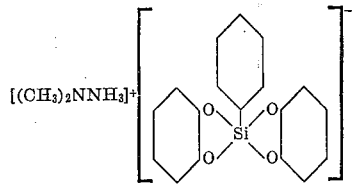

12. The pentacoordinate silicon complex

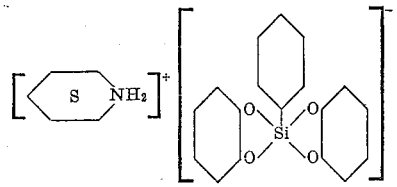

13. The pentacoordinate silicon complex

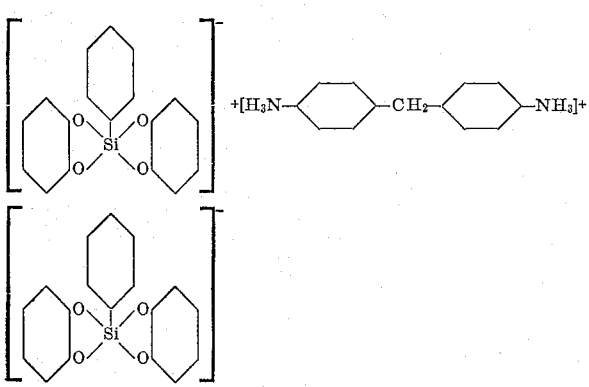

14. The pentacoordinate silicon complex of claim 1 having the general formula

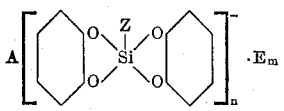

wherein Z is a monovalent hydrocarbon radical, A is a cation formed from an amine and $m$ has a value greater than zero.

15. The pentacoordinate silicon complex of claim 14 wherein Z is a phenyl radical.

16. The pentacoordinate silicon complex

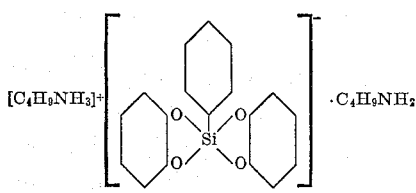

17. The pentacoordinate silicon complex

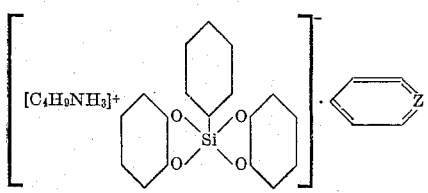

18. The pentacoordinate silicon complex of claim 1 having the general formula

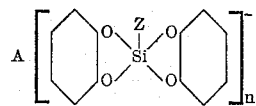

wherein Z is a monovalent hydrocarbon radical and A is a cation formed from a quaternary ammonium compound.

19. The pentacoordinate silicon complex of claim 18 wherein Z is a phenyl radical.

20. The pentacoordinate silicon complex

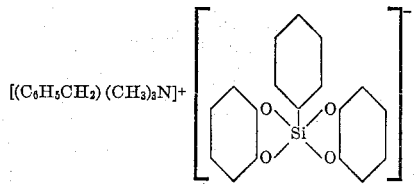

21. A method for preparing a pentacoordinate silicon complex having the general formula

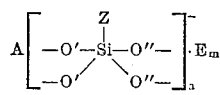

wherein Z is a monovalent radical attached to the silicon atom via a silicon-carbon bond, the O' oxygen atoms are attached to carbon atoms of an aromatic ring which are ortho to each other, the O" oxygen atoms are attached to carbon atoms of an aromatic ring which are ortho to each other, A is a cation formed from a base, $n$ is an integer not greater than the valence of A, E is unprotonated amine when A is formed from an amine and $m$ is from zero to an integer, said method comprising reacting (1) a compound selected from the group consisting of compounds having the formula $ZSiX_3$, wherein Z is as defined above and X is a hydrolyzable radical, and hydrolyzates thereof, (2) an aromatic compound having at least two hydroxy groups on the aromatic ring which are ortho to each other and (3) a base.

22. The method of claim 21 for preparing a pentacoordinate silicon complex having the general formula

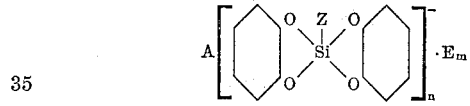

where Z is a monovalent hydrocarbon radical and A is a cation formed from an amine, $n$ is an integer not greater than the valence of A, said method comprising reacting (1) a compound selected from the group consisting of compounds having the formula $ZSiX_3$ wherein Z is as defined above and X is a hydrolyzable radical, and hydrolyzates thereof, (2) catechol and (3) an amine.

23. The method of claim 22 wherein the compound (1) is phenyltrimethoxysilane.

24. The method of claim 23 wherein the amine (3) is benzyldimethylamine.

25. The method of claim 23 wherein the amine (3) is triethylamine.

26. The method of claim 23 wherein the amine (3) is 2,4,6-tri(dimethylaminomethyl)phenol.

27. The method of claim 23 wherein the amine (3) is ethylenediamine.

28. The method of claim 23 wherein the amine (3) is hydrazine.

29. The method of claim 23 wherein (3) is a mixture of amines.

30. The method of claim 29 wherein (3) is a mixture of n-butylamine and pyridine.

31. The method of claim 21 for preparing a pentacoordinate silicon complex having the general formula

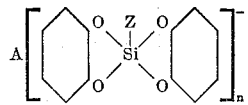

wherein Z is a monovalent hydrocarbon radical and A is a cation formed from a quaternary ammonium compound, said method comprising reacting
(1) a compound selected from the group consisting of compounds having the formula ZSiX$_3$, wherein Z is as defined above and X is a hydrolyzable radical, and hydrolyzates thereof,
(2) catechol and
(3) a quaternary ammonium compound.

32. The method of claim 31 wherein the compound (1) is phenyltrimethoxysilane.

33. The method of claim 32 wherein the quaternary ammonium compound (3) is benzyltrimethylammonium hydroxide.

34. A pentacoordinate silicon complex having the general formula

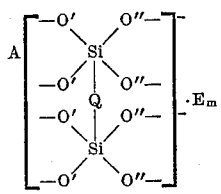

wherein Q is a divalent radical attached to each silicon atom via a silicon-carbon bond, the O' oxygen atoms are attached to carbon atoms of an aromatic ring which are ortho to each other, the O'' oxygen atoms are attached to carbon atoms of an aromatic ring which are ortho to each other, A is a cation formed from a base, and the ratio of anions to cations is such that there is an equal number of positive and negative charges in the complex, E is unprotonated amine when A is formed from an amine and $m$ is from zero to an integer.

35. The pentacoordinate silicon complex of claim 34 having the general formula

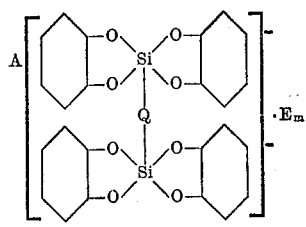

wherein Q is a divalent hydrocarbon radical and A is a cation formed from an amine.

36. The pentacoordinate silicon complex of claim 35 wherein Q is an ethylene radical.

37. The pentacoordinate silicon complex of claim 35 wherein Q is a para phenylene radical.

38. The pentacoordinate silicon complex of claim 34 having the general formula

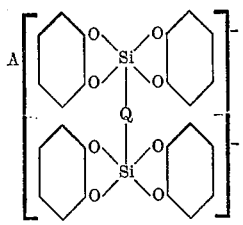

wherein Q is a divalent hydrocarbon radical and A is a cation formed form a quaternary ammonium compound.

39. The pentacoordinate silicon complex of claim 38 wherein Q is an ethylene radical.

40. The pentacoordinate silicon complex of claim 38 wherein Q is a para phenylene radical.

41. A method for preparing a pentacoordinate silicon complex having the general formula

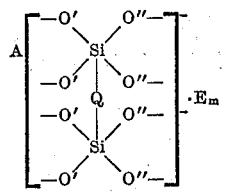

wherein Q is a divalent radical attached to each silicon atom via a silicon-carbon bond, the O' oxygen atoms are attached to carbon atoms of an aromatic ring which are ortho to each other, the O'' oxygen atoms are attached to carbon atoms of an aromatic ring which are ortho to each other, A is a cation formed from a base, the ratio of anions to cations is such that there is an equal number of positive and negative charges in the complex, E is unprotonated amine when A is formed from an amine and $m$ is from zero to an integer, said method comprising reacting
(1) a compound selected from the group consisting of compounds having the formula X$_3$SiQSiX$_3$, wherein Q is as defined above and X is a hydrolyzable radical, and hydrolyzates thereof,
(2) an aromatic compound having at least two hydroxy groups on the aromatic ring which are ortho to each other and
(3) a base.

42. The method of claim 41 for preparing a pentacoordinate silicon complex having the general formula

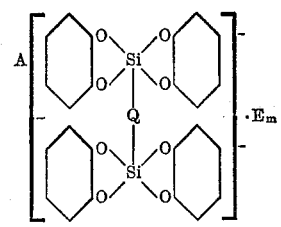

wherein Q is a divalent hydrocarbon radical and A is a cation formed from an amine, said method comprising reacting
(1) a compound selected from the group consisting of compounds having the formula X$_3$SiQSiX$_3$, wherein Q is as defined above and X is a hydrolyzable radical, and hydrolyzates thereof,
(2) catechol and
(3) an amine.

43. The method of claim 42 wherein the compound (1) has the formula X$_3$SiCH$_2$CH$_2$SiX$_3$.

44. The method of claim 42 wherein the compound (1) has the formula

45. The method of claim 41 for preparing a pentacoordinate silicon complex having the general formula

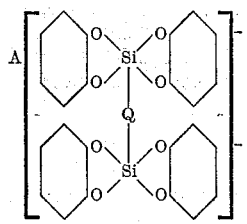

wherein Q is a divalent hydrocarbon radical and A is a cation formed from a quaternary ammonium compound, said method comprising reacting
  (1) a compound selected from the group consisting of compounds having the formula $X_3SiQSiX_3$, wherein Q is as defined above and X is a hydrolyzable radical, and hydrolyzates thereof,
  (2) catechol and
  (3) a quaternary ammonium compound.

46. The method of claim 45 wherein the compound (1) has the formula $X_3SiCH_2CH_2SiX_3$.

47. The method of claim 45 wherein the compound (1) has the formula

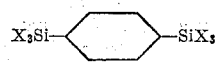

48. The pentacoordinate silicon complex

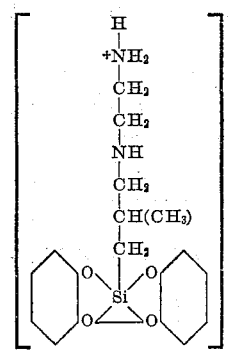

References Cited

Roenheim et al., dZ. Anorg. Allegem. Chem., 196, 160–164 (1931).

WALTER A. MODANCE, *Primary Examiner.*

A. D. SPEVACK, *Assistant Examiner.*